United States Patent
Habib et al.

(10) Patent No.: US 8,111,718 B1
(45) Date of Patent: Feb. 7, 2012

(54) COMMUNICATION SYSTEM AND METHOD THAT REDUCES INTERFERENCE

(75) Inventors: Ahsan Habib, Olathe, KS (US);
Pallavur Sankaranaraynan, Overland Park, KS (US)

(73) Assignee: Clearwire IP Holdings, LLC, Bellevue, WA (US)

( * ) Notice: Subject to any disclaimer, the term of this patent is extended or adjusted under 35 U.S.C. 154(b) by 399 days.

(21) Appl. No.: 11/950,844

(22) Filed: Dec. 5, 2007

(51) Int. Cl.
*H04J 3/06* (2006.01)

(52) U.S. Cl. .................. 370/503; 370/329; 455/450

(58) Field of Classification Search .............. None
See application file for complete search history.

(56) References Cited

U.S. PATENT DOCUMENTS

| | | | | |
|---|---|---|---|---|
| 4,903,324 | A * | 2/1990 | Warnagiris | 455/69 |
| 5,404,574 | A * | 4/1995 | Benveniste | 455/447 |
| 5,649,303 | A * | 7/1997 | Hess et al. | 455/63.3 |
| 5,740,536 | A * | 4/1998 | Benveniste | 455/447 |
| 5,809,427 | A * | 9/1998 | Perreault et al. | 455/513 |
| 6,697,415 | B1 | 2/2004 | Mahany | |
| 6,917,580 | B2 * | 7/2005 | Wang et al. | 370/203 |
| 7,103,374 | B2 * | 9/2006 | Yla-Jaaski et al. | 455/502 |
| 7,174,170 | B2 * | 2/2007 | Steer et al. | 455/446 |
| 7,551,902 | B2 * | 6/2009 | Varshney et al. | 455/101 |
| 2002/0183066 | A1 * | 12/2002 | Pankaj | 455/453 |
| 2004/0077353 | A1 | 4/2004 | Mahany | |
| 2004/0157613 | A1 * | 8/2004 | Steer et al. | 455/446 |
| 2005/0191964 | A1 * | 9/2005 | Hundal | 455/63.1 |
| 2008/0049666 | A1 * | 2/2008 | Golash et al. | 370/329 |

FOREIGN PATENT DOCUMENTS

CA 2324876 A1 * 3/2002

OTHER PUBLICATIONS

Peter Rysavy; "Mobile Broadband EDGE, HSPA & LTE;" White paper developed for 3G Americas; Sep. 2006; pp. 1-76; Rysavy Research.
Farpoint Group; "From Applications to ROI: System Architecture for Wireless Meshes;" A Farpoint Group White Paper; Apr. 2007; 12 pages; Ashland, Massachusetts.
Takeshi Mizuike, et al.; "Optimization of Frequency Assignment for Reduction of Cochannel Interference;" Wiley InterScience Journal; Dec. 5, 2007; 2 pages; http://www3.interscience.wiley.com/cgi-bin/abstract/114200564/ ABSTRACT.

* cited by examiner

*Primary Examiner* — Chi Pham
*Assistant Examiner* — Kouroush Mohebbi
(74) *Attorney, Agent, or Firm* — O'Brien Jones, PLLC

(57) ABSTRACT

A method of operating a communication system is disclosed. The method comprises acquiring a first frequency band for a first device to wireles sly communicate a first data stream. The center frequency of the first frequency band is $f_1$. A second frequency band for a second device to wirelessly communicate a second data stream is acquired. The center frequency of the second frequency band is $f_2$. A third frequency band that is below the first frequency band and is available is found. The center frequency of the third frequency band is $f_3$. A fourth frequency band that is above the first frequency band and is available is found. The center frequency of the fourth frequency band is $f_4$. If a frequency determination factor of $(f_1-f_3)/(f_4-f_1)$ is greater than one, the third frequency band is acquired for the second device.

16 Claims, 5 Drawing Sheets

COMMUNICATION SYSTEM AND METHOD THAT REDUCES INTERFERENCE

TECHNICAL BACKGROUND

Wireless communication may be used as a means of accessing a computer network and have certain advantages over wired communications for accessing a computer network. One of those advantages is a lower cost of infrastructure to provide access to many separate locations or addresses compared to wired communications. This is the so-called "last mile" problem. To use wireless communication to access a network, a customer premises needs to have at least one transceiver in active communication with another transceiver that is connected to the network. Typically, the cost of purchasing and installing these transceivers is much less than a wired connection to the customer's premises.

To facilitate wireless communications, the Institute of Electrical and Electronics Engineers (IEEE) has promulgated a number of wireless standards. These include the 802.11 (WiFi) standards and the 802.16 (WiMax) standards. These standards may include specifications for various aspects of wireless communication with a network including processes for registering on the network, carrier modulation, frequency bands of operation, and message formats. Another term for frequency bands is channels.

Overview

A method of operating a communication system is disclosed. The method comprises acquiring a first frequency band for a first device to wirelessly communicate a first data stream. The center frequency of the first frequency band is $f_1$. A second frequency band is acquired for a second device to wirelessly communicate a second data stream. The center frequency of the second frequency band is $f_2$. A third frequency band is found that is below the first frequency band and is available. The center frequency of the third frequency band is $f_3$. A fourth frequency band is found that is above the first frequency band and is available. The center frequency of the fourth frequency band is $f_4$. If a frequency determination factor of $(f_1-f_3)/(f_4-f_1)$ is greater than one, the third frequency band is acquired for the second device.

A communication system is disclosed. The communication system comprises a controller that assigns a first wireless communication device to exchange communication in a first frequency band. The controller also assigns a second wireless communication device to exchange communication in the first frequency band. The center frequency of the first frequency band is $f_C$. A scanner finds a lower available frequency band and an upper available frequency band. The center frequency of the lower available frequency band is $f_L$. The center frequency of the upper available frequency band is $f_U$, and $f_L<f_C<f_U$. If a frequency determination factor of $(f_C-f_L)/(f_U-f_C)$ is greater than one, the controller reassigns the second wireless communication device to exchange communication in the lower frequency band.

DETAILED DESCRIPTION

Figure 1:
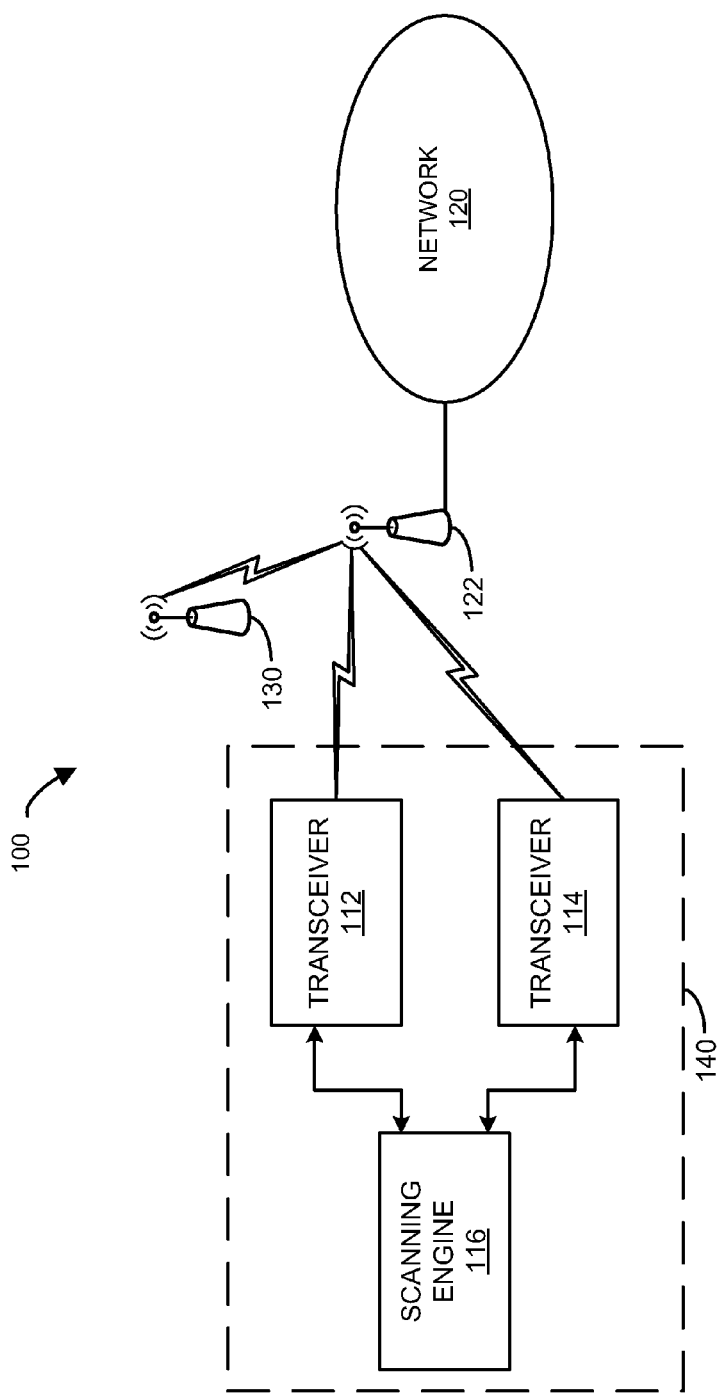
FIG. 1 is a block diagram illustrating a wireless communication system with reduced interference.

FIG. 1 is a block diagram illustrating a wireless communication system with reduced interference. In FIG. 1, communication system 100 comprises transceiver 112, transceiver 114, scanning engine 116, network 120, base station 122, wireless device 130, and customer premises 140.

Customer premises 140 is shown to include transceivers 112 and 114, and scanning engine 116. Customer premises 140 is intended as a concept to show physical proximity, such as a building, data center, switch closet, mounting location, or antenna service shack. Customer premises 140 is not intended to convey a strict metes and bounds description. It should also be understood, that the elements included in customer premises may be owned by different entities and may be physically distributed.

Transceiver 112 is operatively coupled to base station 122 via a wireless communication link. Transceiver 114 is operatively coupled to base station 122 via a wireless communication link. Transceiver 112 is operatively coupled to scanning engine 116. Transceiver 114 is operatively coupled to scanning engine 116. Wireless device 130 is operatively coupled to base station 122 via a wireless communication link. Base station 122 is operatively coupled to network 120. Thus, transceivers 112 and 114, and scanning engine 116, are operatively coupled to network 120 via base station 122.

Network 120 and base station 122 may be part of a network or collection of networks that couple, link, or otherwise operatively connect transceivers 112 and 114 with other devices or systems via base station 122. Network 120 may include other secondary data networks. In an example, network 120 may include a backhaul network, a local network, a long distance network, or a packet network, the internet, or any combination thereof, as well as other types of networks.

In an example, communication network 120 may be, or include all or parts of a WiMAX specified system. In addition to base station 122, these parts may include an access services network (ASN), or connectivity service network (CSN).

Part of network 120 may include any system or collection of systems, such as a database, capable of storing and retrieving information about at least one of: (a) services provided by network 120; (b) services provided by or to networks or users connected to network 120; or, (c) configuration information for network 120. In an example, network 120 includes a CSN that performs authentication, authorization, and accounting operations (AAA). This CSN may manage user or device profiles for authentication (e.g. verifying device identifier, user name, or password) and authorization (e.g. verifying the services or configuration to be allowed).

Network 120 may provide configuration information to base station 122 that specifies various parameters of base station 122's operation. For example, network 120 may configure base station 122 to operate using a smaller number of bands than it is capable of, or licensed to be, using. To illustrate, consider a case where base station 122 is licensed to use the frequency range 2.40 GHz to 2.50 GHz. This 100 MHz of frequency spectrum may be divided into ten (10) frequency bands of 10 MHz each. Base station 122 may be configured to operate using only three or four of these frequency bands. For example, base station 122 may be configured to operate only on the 2.40-2.41 GHz band, the 2.45-2.46 GHz band, and the 2.47-2.48 GHz band. Base station 122 may be configured to only use these bands even though it is both capable of, and licensed to, use the entire range of 2.40-2.50 GHz.

Transceivers 112 and 114, and wireless device 130 are operatively coupled to base station 122 via wireless communication links. These links operate on an acquired frequency band. These acquired frequency bands may be acquired by more than one link. For example, transceivers 112 and 114 may both communicate with base station 122 using the 2.45-2.46 GHz band. In addition, wireless device 130 may use the 2.40-2.41 GHz band.

The band that each of transceivers 112 and 114 and wireless device 130 use may be acquired by contacting base station 122 on a desired band, or by assignment by network 120. For example, transceivers 112 and 114, may contact base station 122 on a frequency band that is received by transceiver 112 or 114 with the strongest signal. If there are multiple frequency bands with approximately the same signal strength, then transceivers 112 and 114 may select the frequency band according to a set algorithm. For example, transceivers 112 and 114 may choose among the frequency bands with the strongest signal by selecting the lowest (or highest) frequency band.

Transceiver 112 and transceiver 114 may acquire the same frequency band. Transceiver 112 and transceiver 114 may acquire frequency bands that are nearby to each other. For example, transceiver 112 may acquire the 2.54-2.55 GHz frequency band and transceiver 114 may acquire the 2.55-2.56 GHz frequency band.

In another example, transceivers 112 or 114, may contact base station 122 on a first frequency band that is received by transceiver 112 or 114. Network 120 may then inform transceiver 112 or 114 that it is to use a particular frequency band. Network 120 may assign the same frequency band to both transceiver 112 and 114. Network 120 may also assign nearby frequency bands to transceivers 112 and 114. For example, network 120 may assign the 2.54-2.55 GHz frequency band to transceiver 112 and the 2.55-2.56 GHz frequency band to transceiver 114.

When transceivers 112 and 114 are at or nearby the same customer premises 140, and they are assigned to the same frequency band, the resulting co-channel interference may degrade the performance of transceiver 112, transceiver 114, or both. When transceivers 112 and 114 are at or nearby the same customer premises 140, and they are assigned to nearby frequency bands, the resulting adjacent channel interference may degrade the performance of transceiver 112, transceiver 114, or both.

To reduce co-channel interference and adjacent channel interference, communication system 100 may acquire or assign frequency bands to transceivers 112 and 114 that are not the same. Communication system 100 may also acquire or assign frequency bands to transceivers 112 and 114 that tend to maximize the separation between the frequency bands.

For example, after transceiver 112 is communicating with base station 122 on a first frequency band, transceiver 114 may seek to acquire a frequency band. Scanning engine 116 may search for a frequency band that will minimize interference. For example, scanning engine 116 may control transceiver 114, or query network 120, to find a second frequency band that is: (a) the highest frequency band available for transceiver 114 to acquire; (b) a frequency band that base station 122 is configured to operate on; and, (c) a frequency band that is higher than the first frequency band, above. Scanning engine 116 may also control transceiver 114 to find a third frequency band that is: (a) the lowest frequency band available for transceiver 114 to acquire; (b) a frequency band that base station 122 is configured to operate on; and, (c) a frequency band that is lower than the first frequency band, above.

The first, second, and third frequency bands have representative frequencies that are a single number (rather than a range) chosen to represent the location of the frequency bands relative to each other. These frequencies are designated $f_1$, $f_2$, and $f_3$ for the representative frequencies of the first, second, and third frequency bands, respectively.

For example, a representative frequency may be the center frequency of the frequency band. The center frequency of a frequency band may be defined as the arithmetic mean or the geometric mean of the range of frequencies in a frequency band. In another example, a representative frequency may be one of the two edge frequencies of the frequency band. In another example, the representative frequency may be some other frequency such as a −3 dB point of the power spectrum of a signal transmitted on the frequency band. However, for the purposes of this discussion, and for the sake of brevity, representative frequencies will be referred to as center frequencies.

Scanning engine 116 may calculate a Frequency Determination Factor (FDF) using center frequencies. In an embodiment, the way scanning engine 116 searched for the second and third frequency bands, ensures that $f_3 < f_1 < f_2$. FDF may be calculated as: $FDF = (f_1 - f_3)/(f_2 - f_1)$. If FDF is less than 1, scanning engine 116 may control transceiver 114 to acquire and use the second frequency band. If FDF is greater than 1, scanning engine 116 may control transceiver 114 to acquire and use the third frequency band.

In another example, after transceiver 114 has acquired, or been assigned, a frequency band, a new frequency band may become available. For example, wireless device 130 may release or stop using a frequency band. In this case, scanning engine 116 may repeat the search for a second and third frequency bands. This search may result in scanning engine 116 choosing the frequency band that wireless device 130 released as either the second frequency band or the third frequency band. Scanning engine 116 may calculate a new FDF based upon the new second or third frequency band. Scanning engine 116 may control transceiver 114 to acquire a new frequency band based upon the new FDF calculation. Scanning engine 116 may repeat the search for a second and third frequency band continuously, or for a fixed period of time. In another example, scanning engine 116 may repeat the search for a second and third frequency band a fixed number of times.

In another example, after either a fixed period of time, or a fixed number of searches for a new frequency band to be used by transceiver 114, scanning engine 116 may search for a new frequency band for transceiver 112. Scanning engine 116 may search for a frequency band that will minimize interference. For example, assume the previous search or searches resulted in transceiver 114 using a first frequency band. Scanning engine 116 may control transceiver 112, or query network 120, to find a second frequency band that is: (a) the highest frequency band available for transceiver 112 to acquire; (b) a frequency band that base station 122 is configured to operate on; (c) a frequency band that is higher than the first frequency band, above; and, (d) higher than the frequency band currently being used by transceiver 112. Scanning engine 116 may also control transceiver 112 to find a third frequency band that is: (a) the lowest frequency band available for transceiver 112 to acquire; (b) a frequency band that base station 122 is configured to operate on; (c) a frequency band that is lower than the first frequency band, above; and, (d) lower than the frequency band currently being used by transceiver 112. Scanning engine 116 may then calculate a new FDF and control transceiver 112 to acquire a new frequency band.

Figure 2:
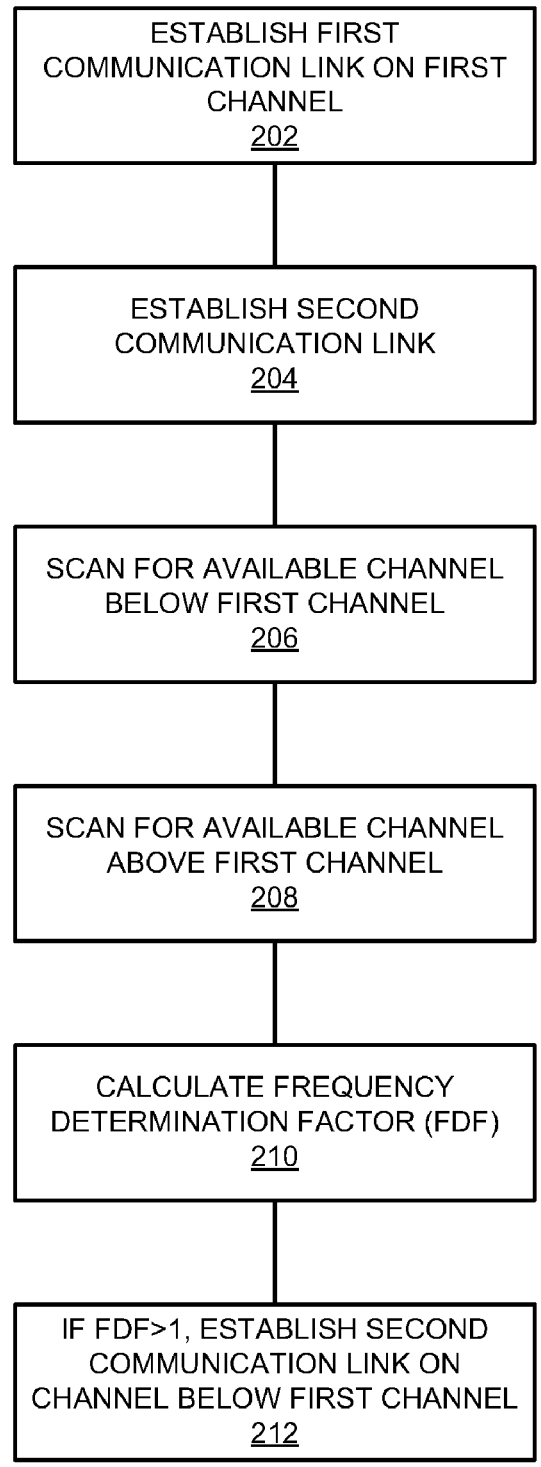
FIG. 2 is a flowchart illustrating a method of operating a communication system to reduce interference.

FIG. 2 is a flow chart illustrating a method of operating a communication system to reduce interference. The steps of FIG. 2 may be performed by communication system 100. A first communication link is established on a first channel (202). This first channel is assigned a representative frequency value of $f_C$. For example, this first communication link may be established wirelessly between transceiver 112 and base station 122.

A second communication link is established (204). For example, this second communication link may be established wirelessly between transceiver 114 and base station 122. The second communication link may be on the same channel as the first communication link, or it may be on a different channel. The second communication link may be of limited functionality. For example, the second communication link may only be a communication link for control and configuration information and may not be a communication link typically used for data transport or other services. For example, the second communication link may be limited to the WiMAX Medium Access Control (MAC) contention process. In another example, the second communication link may be limited to registering transceiver 114 with base station 122 and network 120. In another example, the second communication link may be a fully functional communication link.

Channels below the first channel are scanned to determine if they are available (206). For example, scanning engine 116 may control transceiver 114, or query network 120, to find a channel that is: (a) the lowest channel available for transceiver 114 to acquire; (b) a channel that base station 122 is configured to operate on; and, (c) a channel that is lower in frequency than the first channel, above. Once a channel that meets these criteria is found, it is associated with a representative frequency value of $f_L$.

Channels above the first channel are scanned to determine if they are available (208). For example, scanning engine 116 may control transceiver 114, or query network 120, to find a channel that is: (a) the highest channel available for transceiver 114 to acquire; (b) a channel that base station 122 is configured to operate on; and, (c) a channel that is higher in frequency than the first channel, above. Once a channel that meets these criteria is found, it is associated with a representative frequency value of $f_U$.

A Frequency Determination Factor is calculated (210). For example, FDF may be calculated as: $FDF=(f_C-f_L)/(f_U-f_C)$.

If FDF>1, the second communication link is established on a channel below the first channel (212). For example, scanning engine 116 may control transceiver 114 to acquire and use the channel associated with $f_L$. In another example, if FDF<1, scanning engine 116 may control transceiver 114 to acquire and use the channel associated with $f_U$.

In another example, steps 204-212 may be repeated. These steps may be repeated for a fixed period of time, or for a fixed number of iterations. In another example, after a fixed period of time, or a fixed number of iterations, steps 204-212 may be repeated except for exchanging the roles of the first communication link and the second communication link. In other words, the scanning for available channels of steps 206 and 208 take place above and below the channel of the second communication link. The scanning would not accept channels that were not below or above the first communication link for steps 206 and 208, respectively. The first communication link is established on a channel below the channel of the second communication link if the FDF is greater than one in step 212.

Figure 3:
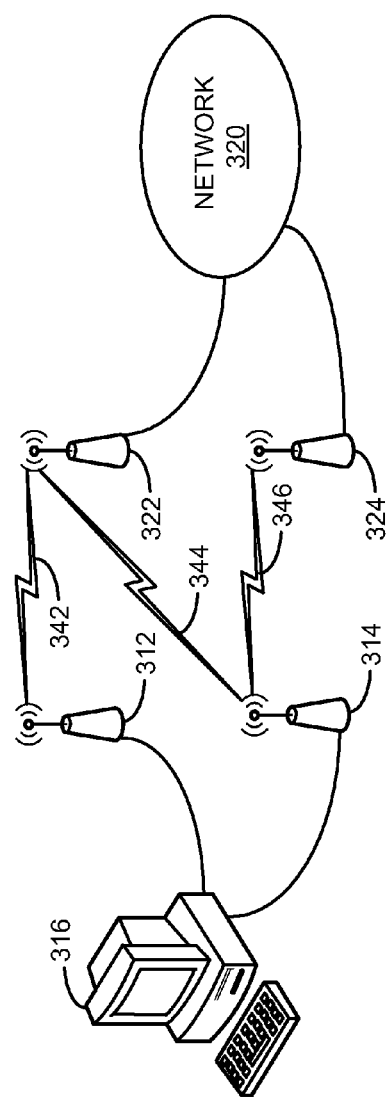
FIG. 3 is a block diagram illustrating a wireless communication system with reduced interference.

FIG. 3 is a block diagram illustrating a wireless communication system with reduced interference. In FIG. 3, communication system 300 comprises transceiver 312, transceiver 314, scanning computer 316, network 320, base station 322, base station 324, communication link 342, communication link 344, and communication link 346.

Transceiver 312 is operatively coupled to base station 322 via wireless communication link 342. Transceiver 314 may be operatively coupled to base station 322 via wireless communication link 344. Transceiver 314 may be operatively coupled to base station 324 via wireless communication link 346. Transceiver 312 and transceiver 314 are operatively coupled to scanning computer 316. Base station 322 is operatively coupled to network 320. Thus, transceivers 312 and 314, and scanning computer 316 may be operatively coupled to network 320 via base station 322.

Network 320, base station 322, and base station 324 may be part of a network or collection of networks that couple, link, or otherwise operatively connect transceivers 312 and 314 with other devices or systems via at least one of base stations 322 and 324. Network 320 may include other secondary data networks. In an example, network 320 may include a backhaul network, a local network, a long distance network, or a packet network, the internet, or any combination thereof, as well as other types of networks.

In an example, communication network 320 may be, or include all or parts of a WiMAX specified system. In addition to base stations 322 and 324, these parts may include an access services network (ASN), or connectivity service network (CSN).

Part of network 320 may include any system or collection of systems, such as a database, capable of storing and retrieving information about at least one of: (a) services provided by network 320; (b) services provided by or to networks or users connected to network 320; or, (c) configuration information for network 320. In an example, network 320 includes a CSN that performs authentication, authorization, and accounting operations. This CSN may manage user or device profiles for authentication (e.g. verifying device identifier, user name, or password) and authorization (e.g. verifying the services or configuration to be allowed).

Network 320 may provide configuration information to base stations 322 and 324 that specifies various parameters for the operation of base stations 322 and 324. For example, network 320 may configure base station 322 or base station 324 to operate using a smaller number of bands than it is capable of, or licensed to be, using.

To illustrate, consider a case where network 320 is licensed to use the frequency range 2.40 GHz to 2.50 GHz. This 100 MHz of frequency spectrum may be divided into ten (10) frequency bands of 10 MHz each. Base station 322 and base station 324 may be configured to operate using only three or four of these frequency bands each. For example, base station 322 may be configured to operate only on the 2.40-2.41 GHz band, the 2.45-2.46 GHz band, and the 2.47-2.48 GHz band. Base station 324 may be configured to operate only on the 2.42-2.43 GHz band, the 2.46-2.47 GHz band, and the 2.48-2.49 GHz band.

Transceivers 312 and 314 may be operatively coupled to base station 322 via wireless communication links 342 and 344, respectively. Transceiver 314 may be operatively coupled to base station 324 via wireless communication link 346. Each of these communication links 342-346 operate on an assigned frequency band. These assigned frequency bands may be assigned to more than one link. For example, communication links 342 and 344 may both operate using the 2.45-2.46 GHz band. In addition, communication link 346 may operate using the 2.40-2.41 GHz band.

The band that each communication link 342-346 use may be selected by transceivers 312 and 314, or may be determined by network 320. For example, transceivers 312 and 314, may initiate communication links 342 and 344, respectively, on a frequency band that is received by transceiver 312 and 314 with the strongest signal. If there are multiple frequency bands with approximately the same signal strength, then transceivers 312 and 314 may select the frequency band according to a set algorithm. For example, transceivers 312 and 314 may choose among the frequency bands with the strongest signal by selecting the lowest frequency band.

Transceivers 312 and 314 may initiate communication links 342 and 344 on the same frequency band. Transceivers 312 and 314 may initiate communication links 342 and 344 on frequency bands that are nearby to each other. For example, transceiver 312 may initiate communication link 342 on the 2.54-2.55 GHz frequency band and transceiver 314 may initiate communication link 344 on the 2.55-2.56 GHz frequency band.

In another example, transceivers 312 and 314, initiate communication links 342 and 344. Network 320 may then inform transceivers 312 and 314 that at least one of communication links 342 and 344 should change frequency bands. Network 320 may assign the same frequency band to both communication links 342 and 344. Network 320 may also assign nearby frequency bands to communication links 342 and 344. For example, network 320 may assign the 2.54-2.55 GHz frequency band to communication link 342 and the 2.55-2.56 GHz frequency band to communication link 344.

When transceivers 312 and 314 are physically nearby each other, and communication links 342 and 344 are on the same frequency band, the resulting co-channel interference may degrade the performance of communication links 342, 344, or both. When transceivers 312 and 314 are physically nearby each other, and they are assigned to nearby frequency bands, the resulting adjacent channel interference may degrade the performance of communication links 342, 344, or both.

To reduce co-channel interference and adjacent channel interference, communication links 342 and 344 may use frequency bands that are not the same. Communication links 342 and 344 may also use frequency bands that tend to maximize the separation between the frequency bands they are each using.

For example, after communication link 342 is established on a first frequency band, transceiver 314 may seek to initiate communication link 344. Scanning computer 316 may search for a frequency band that will minimize interference. For example, scanning computer 316 may control transceiver 314, or query network 320, to find a second frequency band that is the highest frequency band available for communication link 344 and is also a frequency band that is higher than the first frequency band, above. Scanning computer 316 may also control transceiver 314 to find a third frequency band that is the lowest frequency band available for communication link 344 and is also a frequency band that is lower than the first frequency band, above.

The first, second, and third frequency bands have representative frequencies that are a single number (rather than a range) chosen to represent the location of the frequency bands relative to each other. These frequencies are designated $f_1$, $f_2$, and $f_3$ for the representative frequencies of the first, second, and third frequency bands, respectively.

For example, a representative frequency may be the center frequency of the frequency band. The center frequency of a frequency band may be defined as either the arithmetic mean or the geometric mean of the range of frequencies in a frequency band.

In another example, a representative frequency may be one of the two edge frequencies of the frequency band. In another example, the representative frequency may be some other frequency such as a −3 dB point of the power spectrum of a signal transmitted on the frequency band. However, for the purposes of this discussion, and for the sake of brevity, representative frequencies will be referred to as center frequencies.

Scanning computer 316 may calculate a Frequency Determination Factor (FDF) using center frequencies. Because of the way scanning computer 316 searched for the second and third frequency bands, it is known that $f_3<f_1<f_2$. FDF may be calculated as: $FDF=(f_1-f_3)/(f_2-f_1)$. If FDF is less than 1, scanning computer 316 may control transceiver 314 to establish communication link 344 using the second frequency band. If FDF is greater than 1, scanning computer 316 may control transceiver 314 to establish communication link 344 using the third frequency band.

In another example, after communication link 344 has been established, a new frequency band may become available. In this case, scanning computer 316 may repeat the search for a second and third frequency bands. This search may result in scanning computer 316 choosing the newly available frequency band as either the second or third frequency bands. Scanning computer 316 may calculate a new FDF based upon the new second or third frequency band. Scanning computer 316 may control transceiver 314 to initiate communication link 344 on a new frequency band based upon the new FDF calculation. Scanning computer 316 may repeat the search for a second and third frequency band continuously, or for a fixed period of time. In another example, scanning computer 316 may repeat the search for a second and third frequency band a fixed number of times.

In another example, after either a fixed period of time, or a fixed number of searches for a new frequency band for communication link 344, scanning computer 316 may search for a new frequency band for communicating link 342. Scanning computer 316 may search for a frequency band that will minimize interference. For example, assume the previous search or searches resulted in communication link 344 using a first frequency band. Scanning computer 316 may control transceiver 312, or query network 320, to find a second frequency band that is: (a) the highest frequency band available for communication link 342; (b) a frequency band that is higher than the first frequency band, above; and, (c) higher than the frequency band currently being used by communication link 342. Scanning computer 316 may also control transceiver 312 to find a third frequency band that is: (a) the lowest frequency band available for communication link 342; (b) a frequency band that is lower than the first frequency band, above; and, (c) lower than the frequency band currently being used by communication link 342. Scanning computer 316 may then calculate a new FDF and control transceiver 312 to establish communication link 342 on a new frequency band.

In another example, after communication link 342 is established on a first frequency band, transceiver 314 may seek to initiate communication link 346. Scanning computer 316 may search for a frequency band that will minimize interference. For example, scanning computer 316 may control transceiver 314, or query network 320, to find a second frequency band that is: (a) the highest frequency band available for communication link 346; (b) a frequency band that is higher than the first frequency band, above; and, (c) a frequency band that is not used by base station 322. Scanning computer 316 may also control transceiver 314 to find a third frequency band that is: (a) the lowest frequency band available for communication link 346; (b) a frequency band that is lower than the first frequency band, above; and, (c) a frequency band that is not used by base station 322.

The first, second, and third frequency bands have representative frequencies that are a single number (rather than a range) chosen to represent the location of the frequency bands relative to each other. These frequencies are designated $f_1$, $f_2$, and $f_3$ for the representative frequencies of the first, second, and third frequency bands, respectively.

For example, a representative frequency may be the center frequency of the frequency band. The center frequency of a frequency band may be defined as either the arithmetic mean or the geometric mean of the range of frequencies in a frequency band. In another example, a representative frequency may be one of the two edge frequencies of the frequency band. In another example, the representative frequency may be some other frequency such as a −3 dB point of the power spectrum of a signal transmitted on the frequency band. However, for the purposes of this discussion, and for the sake of brevity, representative frequencies will be referred to as center frequencies.

Scanning computer 316, or some other device, may calculate a Frequency Determination Factor (FDF) using center frequencies. Because of the way scanning computer 316 searched for the second and third frequency bands, it is known that $f_3 < f_1 < f_2$. FDF may be calculated as: $FDF=(f_1-f_3)/(f_2-f_1)$. If FDF is less than 1, scanning computer 316 may control transceiver 314 to establish communication link 346 using the second frequency band. If FDF is greater than 1, scanning computer 316 may control transceiver 314 to establish communication link 346 using the third frequency band. By establishing communication link 346 as a replacement for communication link 344 using the FDF process described above, co-channel and adjacent channel interferences are minimized at base stations 322 and 324.

Figure 4:
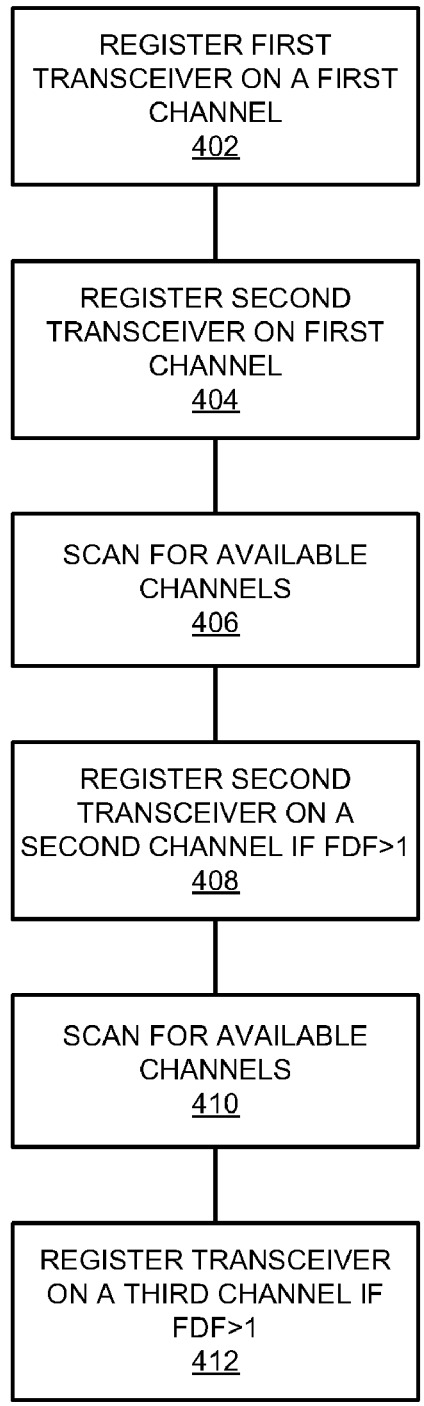
FIG. 4 is a flowchart illustrating a method of operating a communication system to reduce interference.

FIG. 4 is a flow chart illustrating a method of operating a communication system to reduce interference. The steps of FIG. 4 may be performed by communication system 100 or 300. A first transceiver is registered on a first channel (402). This first channel is assigned a representative frequency value of $f_C$. A second transceiver is registered on the first channel (404).

Channels below and above the first channel are scanned to determine if they are available (406). For example, scanning computer 316 may control transceiver 314, or query network 320, to find a channel that is: (a) the lowest channel available for transceiver 314 to acquire; (b) a channel that base station 322 or base station 324 are configured to operate on; and, (c) a channel that is lower in frequency than the first channel, above. Once a channel that meets these criteria is found, it is associated with a representative frequency value of $f_L$. Likewise, channels above the first channel are scanned to determine if they are available. Scanning computer 316 may control transceiver 314, or query network 320, to find a channel that is: (a) the highest channel available for transceiver 314 to acquire; (b) a channel that base station 322 or base station 324 are configured to operate on; and, (c) a channel that is higher in frequency than the first channel, above. Once a channel that meets these criteria is found, it is associated with a representative frequency value of $f_U$.

A Frequency Determination Factor is calculated and if it is greater than one, the second transceiver is registered on a second channel (408). The second channel has a representative frequency value of $f_L$. In an example, an FDF may be calculated as: $FDF=(f_C-f_L)/(f_U-f_C)$.

Channels below and above the first and second channels are scanned to determine if a new channel that may cause less interference has become available (410). For example, scanning computer 316 may control transceiver 314, or query network 320, to find a channel that is: (a) the lowest channel available for transceiver 314 to acquire; (b) a channel that base station 322 or base station 324 are configured to operate on; and, (c) a channel that is lower in frequency than the first and second channels, above. Once a channel that meets these criteria is found, it is associated with a representative frequency value of $f_L$. Likewise, channels above the first and second channels are scanned to determine if they are available. Scanning computer 316 may control transceiver 314, or query network 320, to find a channel that is: (a) the highest channel available for transceiver 314 to acquire; (b) a channel that base station 322 or base station 324 are configured to operate on; and, (c) a channel that is higher in frequency than the first and second channels, above. Once a channel that meets these criteria is found, it is associated with a representative frequency value of $f_U$.

A Frequency Determination Factor is calculated and if it is greater than one, the second transceiver is registered on a third channel (412). The third channel has a representative frequency value of $f_L$. In an example, an FDF may be calculated as: $FDF=(f_C-f_L)/(f_U-f_C)$.

In another example, steps 410 and 412 may be repeated. These steps may be repeated for a fixed period of time, or for a fixed number of iterations. In another example, after a fixed period of time, or a fixed number of iterations, steps 410 and 412 may be repeated except for exchanging the roles of the first transceiver and the second transceiver. In other words, the FDF would be calculated using the center frequency ($f_C$) of the first transceiver and the first transceiver would be registered on the third channel ($f_L$) if the FDF was greater than one.

The methods, systems, networks, transceivers, engines, and base stations described above may be implemented with, contain, or be executed by one or more computer systems. The methods described above may also be stored on a computer readable medium. Many of the elements of communication network 100 and communication network 300 may be, comprise, or include computers systems. This includes, but is not limited to: communication systems 100 and 300; scanning engine 116; transceivers 112, 114, 312 and 314; scanning computer 316; base stations 122, 322, and 324; networks 120 and 320; and, wireless device 130.

Figure 5:
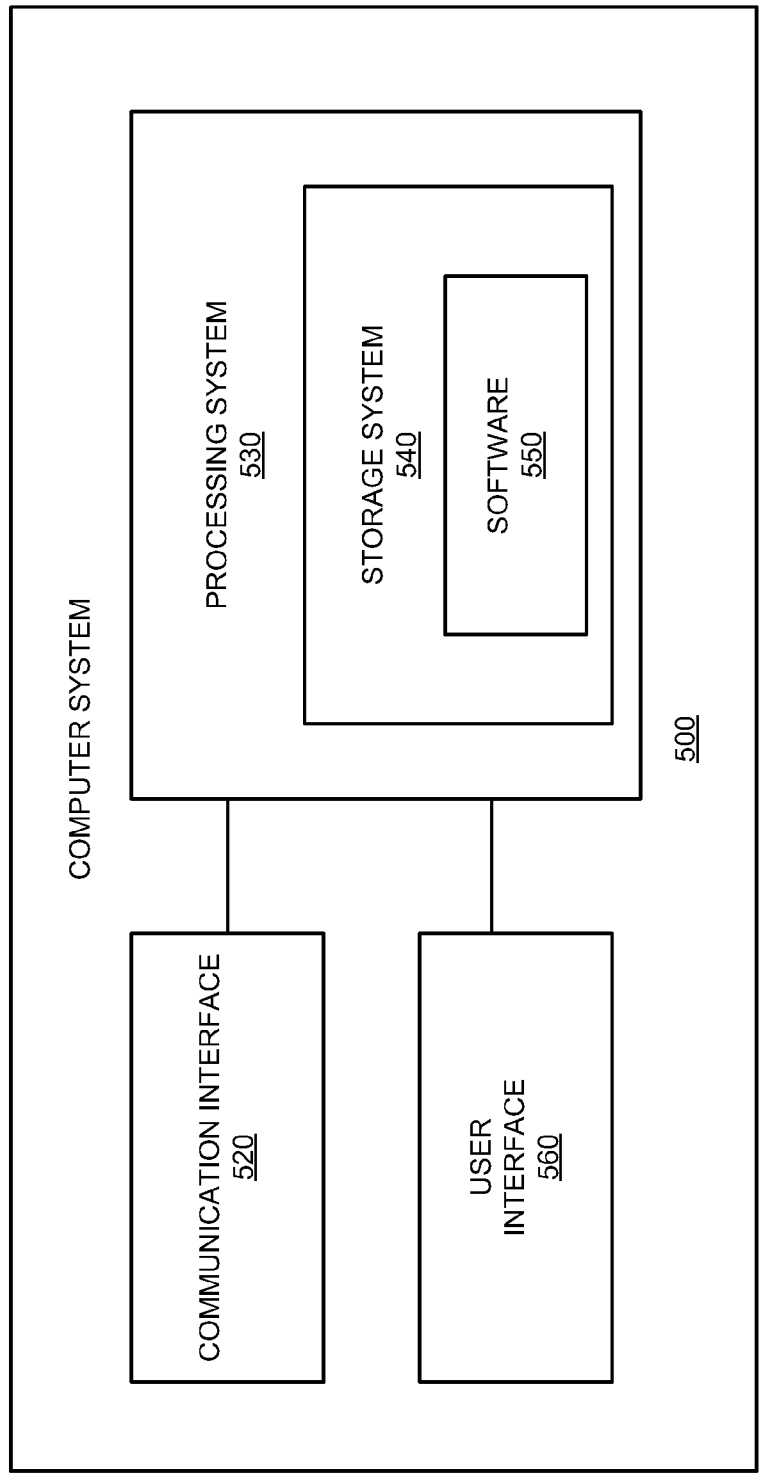
FIG. 5 is a block diagram illustrating a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices.

User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
   acquiring, by a scanning device coupled to a first device and a second device, a first frequency band for the first device to wirelessly communicate a first data stream, wherein the center frequency of said first frequency band is $f_1$;
   acquiring, by the scanning device, a second frequency band for the second device to wirelessly communicate a second data stream, wherein the center frequency of said second frequency band is $f_2$, wherein $f_2$ is higher than $f_1$;
   scanning, by the scanning device via the second device, to find a third frequency band that is below the first frequency band and is available, wherein the center frequency of said third frequency band is $f_3$;
   scanning, by the scanning device via the second device, to find a fourth frequency band that is above the second frequency band and is available, wherein the center frequency of said fourth frequency band is $f_4$;
   if the scanning device determines that $(f_1-f_3)/(f_4-f_1)>1$, acquiring $f_3$ and assigning it to said second device as assigned frequency $f_A$; and
   if the scanning device determines that $(f_1-f_3)/(f_4-f_1)<1$, acquiring $f_4$ and assigning it to said second device as assigned frequency $f_A$.

2. The method of claim 1, further comprising:
   scanning, by the scanning device via the second device, to find a new third frequency band that is below $f_A$ and is available, wherein the center frequency of said new third frequency band is $f_{3N}$, and $f_{3N}$ is further from $f_1$ than $f_A$;
   scanning, by the scanning device via the second device, to find a new fourth frequency band that is above $f_A$ and is available, wherein the center frequency of said new fourth frequency band is $f_{4N}$, and $f_{4N}$ is further from $f_1$ than $f_A$;
   if $(f_1-f_{3N})/(f_{4N}-f_1)>1$, acquiring $f_{3N}$ and assigning $f_{3N}$ to said second device as $f_A$; and
   if $(f_1-f_{3N})/(f_{4N}-f_1)<1$, acquiring $f_{4N}$ and assigning $f_{4N}$ to said first second device as $f_A$.

3. The method of claim 2, wherein said scanning to find a new third frequency, said scanning to find a new fourth frequency, and said acquiring is repeated a predetermined number of times.

4. The method of claim 1 wherein said step of scanning to find a third frequency band comprises querying a network for an available frequency band.

5. A communication system, comprising:
   a first wireless communication device;
   a second wireless communication device;
   a network controller coupled to the first and second device through a wireless network configured to assign the first wireless communication device to exchange communication in a first frequency band and to assign the second wireless communication device to exchange communication in said first frequency band, wherein the center frequency of said first frequency band is $f_C$;
   a scanner coupled to the first wireless communication device and the second wireless communication device configured to find a lower available frequency band and an upper available frequency band, wherein the center frequency of said lower available frequency band is $f_L$, the center frequency of the upper available frequency band is $f_U$, and $f_L<f_C<f_U$,
   wherein, if $(f_C-f_L)/(f_U-f_C)>1$, said network controller reassigns said second wireless communication device to exchange communication in said lower frequency band $f_L$, and
   wherein if $(f_C-f_L)/(f_U-f_C)<1$, said network controller reassigns said second wireless communication device to exchange communication in said upper frequency band $f_U$.

6. The communication system of claim 5 wherein said second wireless communication device exchanges communication in said lower frequency band $f_L$;
   wherein said scanner is further configured to find a second lower available frequency band and a second upper available frequency band;
   wherein the center frequency of said lower available frequency band is $f_{L2}$ and the center frequency of the upper available frequency band is $f_{U2}$, and $f_{L2}<f_L<f_C<f_{U2}$; and
   wherein, if $(f_C-f_{L2})/(f_{U2}-f_C)>1$, said network controller reassigns said second wireless communication device to exchange communication in said second lower frequency band $f_{L2}$.

7. The communication system of claim 6 wherein, if $(f_L-f_{L2})/(f_{U2}-f_L)<1$, said network controller reassigns said first wireless communication device to exchange communication in said second upper frequency band $f_{U2}$.

8. The communication system of claim 6 wherein said network controller reassigns said first wireless communication device to exchange communication in a new frequency band a predetermined number of times.

9. The communication system of claim 5 wherein said network controller reassigns said second wireless communication device to exchange communication in a new frequency band a predetermined number of times.

10. A method of operating a communication system, comprising:
    establishing, by a first device, a first communication link in a first frequency band for a said first device to wirelessly exchange communication with a first base station, wherein the center frequency of said first frequency band is $f_1$;

establishing, by a second device, a second communication link in said first frequency band for said second device to wirelessly exchange communication with said first base station;

scanning, by a scanning device coupled to said first device and said second device, to find a third frequency band that is below the first frequency band and is available to said second device to wirelessly exchange communication with a second base station, wherein the center frequency of said third frequency band is $f_3$;

scanning to find a fourth frequency band that is above the first frequency band and is available to said second device to wirelessly exchange communication with said second base station, wherein the center frequency of said fourth frequency band is $f_4$; and, if $(f_1-f_3)/(f_4-f_1)>1$, acquiring, by said second device, said third frequency band for said second device to wirelessly exchange communication with said second base station.

11. The method of claim 10, further comprising:
if $(f_1-f_3)/(f_4-f_1)<1$, acquiring, by said second device, said fourth frequency band for said second device to wirelessly exchange communication with said second base station.

12. The method of claim 10, wherein if $(f_1-f_3)/(f_4-f_1)>1$, the method further comprises:
   repeating said step of scanning to find a third frequency band to find a new third frequency band that is further away from $f_1$ than $f_3$;
   repeating said step of scanning to find a fourth frequency band to find a new fourth frequency band that is further away from $f_1$ than $f_3$; and,
   if $(f_1-\text{new third frequency band})/(\text{new fourth frequency}-f_1)>1$, acquiring said third frequency band for said second device to wirelessly exchange communication with said second base station.

13. The method of claim 12, wherein said step of acquiring said third frequency band is repeated a predetermined number of times.

14. The method of claim 10, further comprising the steps of:
   scanning to find a fifth frequency band that is below the first frequency band, and below said third frequency band, and is available to wirelessly exchange communication with a second base station, wherein the center frequency of said fifth frequency band is $f_5$;
   scanning to find a sixth frequency band that is above the first frequency band and is available to wirelessly exchange communication with said second base station, wherein the center frequency of said sixth frequency band is $f_6$; and,
   if $(f_3-f_5)/(f_6-f_3)>1$, acquiring said fifth frequency band for said first device to wirelessly exchange communication with said second base station.

15. The method of claim 14,
   wherein said step of acquiring said fifth frequency band is repeated a predetermined number of times.

16. The method of claim 10 wherein said step of scanning to find a third frequency comprises querying a network for an available frequency band.

* * * * *